United States Patent
Mueller et al.

(10) Patent No.: US 8,278,874 B2
(45) Date of Patent: Oct. 2, 2012

(54) APPARATUS AND METHOD FOR BALANCING THE TRANSFER OF ELECTRICAL ENERGY FROM AN EXTERNAL POWER SOURCE TO A VEHICLE

(75) Inventors: Mark Anthony Mueller, Fenton, MI (US); Peter A. Hatch, Royal Oak, MI (US); David A. Hein, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 345 days.

(21) Appl. No.: 12/775,124

(22) Filed: May 6, 2010

(65) Prior Publication Data

US 2010/0295508 A1   Nov. 25, 2010

Related U.S. Application Data

(60) Provisional application No. 61/180,613, filed on May 22, 2009.

(51) Int. Cl.
*H02J 7/00*   (2006.01)
(52) U.S. Cl. ........................................ 320/109; 320/161
(58) Field of Classification Search .................... 320/109
See application file for complete search history.

(56) References Cited

U.S. PATENT DOCUMENTS

| | | |
|---|---|---|
| 3,633,070 A | 1/1972 | Vassos |
| 3,953,766 A | 4/1976 | Howell et al. |
| 4,063,299 A | 12/1977 | Munroe |
| 4,068,276 A | 1/1978 | Pintell |
| RE32,901 E * | 4/1989 | Nilssen .......................... 315/244 |
| 5,424,894 A | 6/1995 | Briscall et al. |
| 5,670,833 A * | 9/1997 | Mengelt et al. .................. 307/66 |
| 5,696,367 A * | 12/1997 | Keith ............................. 235/381 |
| 5,815,012 A * | 9/1998 | Rivoir et al. ................... 327/103 |
| 6,009,000 A * | 12/1999 | Siri .............................. 363/21.09 |
| 6,512,359 B1 | 1/2003 | Tamai et al. |
| 6,646,429 B2 | 11/2003 | Gohara et al. |
| 6,697,239 B2 | 2/2004 | Pixley et al. |
| 2001/0011880 A1* | 8/2001 | James ........................... 320/104 |
| 2010/0194354 A1* | 8/2010 | Gotou et al. ................... 320/163 |

FOREIGN PATENT DOCUMENTS

WO   2010049775 A2   5/2010

\* cited by examiner

*Primary Examiner* — Arun Williams
(74) *Attorney, Agent, or Firm* — Brooks Kushman P.C.

(57) ABSTRACT

In at least one embodiment, a device for balancing a flow of electrical energy from a vehicle to an external power source is provided. The device comprises a balance circuit being configured to receive an input current signal from the power source and to transmit an output current signal to the external power source for charging a element in a vehicle. A differential resistance causes the input current signal and the output current signal to be different. A current measuring device is configured to generate an output differential signal indicating a difference between the input and output current signals. A current generating device is configured to generate a compensated current signal in response to the output differential signal and to adjust the output current signal with the compensated current signal such that the input and output current signals are generally similar to one another.

20 Claims, 3 Drawing Sheets

APPARATUS AND METHOD FOR BALANCING THE TRANSFER OF ELECTRICAL ENERGY FROM AN EXTERNAL POWER SOURCE TO A VEHICLE

CROSS-REFERENCE TO RELATED APPLICATIONS

This application claims the benefit of U.S. provisional application Ser. No. 61/180,613 filed on May 22, 2009, which is hereby incorporated by reference in its entirety.

TECHNICAL FIELD

The embodiments of the present invention generally relate to an apparatus and method for balancing a circuit that is used in connection with charging at least one vehicle storage element.

BACKGROUND

Plug-in electrical vehicles (EV) generally include one or more electrical batteries that store electrical power that is provided from an external power source. The external power source is positioned about a residential or commercial establishment. For example, the EV may include a plug that is configured to mate with an electrical outlet that is operably coupled to the external power source. The batteries within the EV may receive and store electrical energy from the external power source. The concept of providing power from the external power source that is associated with a residential or commercial establishment to a vehicle for the purpose of charging vehicle batteries is gaining increased attention from the vehicle industry at large.

SUMMARY

In at least one embodiment, a device for balancing a flow of electrical energy from a vehicle to a power source that is positioned external to the vehicle, the vehicle being arranged to form a differential resistance. The device comprises a balance circuit being configured to receive an input current signal from the power source and to transmit an output current signal to the power source for charging at least one storage element in the vehicle. The differential resistance causes the input current signal and the output current signal to differ by a differential current amount. The balance circuit includes a current measuring device and a current generating device. The current measuring device is configured to generate an output differential signal corresponding to the differential current amount. The current generating device is configured to generate a compensated current signal that is generally similar to the differential current amount in response to the output differential signal. The current generating device is further configured to adjust the output current signal with the compensated current signal such that the output current signal is generally similar to the input current signal.

In another embodiment, a device for balancing a flow of electrical energy from a vehicle to an external power source is provided. The vehicle is arranged to form a differential resistance. The device comprises a balance circuit that is configured to receive an input current signal from the power source and to transmit an output current signal to the external power source for charging at least one storage element in a vehicle. The differential resistance causes the input current signal and the output current signal to be different from one another. The balance circuit comprises a current measuring device and a current generating device. The current measuring device is configured to generate an output differential signal indicating a difference between the input current signal and the output current signal. The current generating device is configured to generate a compensated current signal in response to the output differential signal. The current generating device is further configured to adjust the output current signal with the compensated current signal such that the output current signal is generally similar to the input current signal.

In another embodiment, a method for balancing a flow of electrical energy from a vehicle to an external power source is provided. The vehicle is arranged to form a differential resistance. The method comprises receiving an input signal from the external power source to charge at least one vehicle storage element and transmitting an output signal to the external power source, wherein the differential resistance causes the input signal and the output signal to be different from one another. The method further comprises measuring a difference between the input signal and the output signal and generating a compensated signal based on the difference. The method further comprises adjusting the output signal with the compensated signal such that the output signal is generally similar to the input signal.

BRIEF DESCRIPTION OF THE DRAWINGS

The embodiments of the present invention are pointed out with particularity in the appended claims. However, other features of the various embodiments will become more apparent and will be best understood by referring to the following detailed description in conjunction with the accompany drawings in which:

DETAILED DESCRIPTION

The embodiments of the present invention generally provide a balance circuit that is configured to balance a flow of electrical energy between an external power source that is positioned about a building and at least one storage element in a vehicle. A vehicle may form a differential resistance which may cause leakage currents. Such a differential resistance may cause the input energy that is flowing from the external power source into the vehicle to be different than an output energy source that is flowing from the vehicle back to the external power source when the vehicle undergoes a charging operation (e.g., vehicle receives energy from external power source to charge a storage element positioned therein). The balance circuit is configured to determine a difference between the input energy that is flowing from the external power source and the output energy that is flowing from the vehicle back to the external power source as the vehicle undergoes the charging operation. The balance circuit is further configured to adjust the output energy with compensated energy to generate an adjusted output energy that is generally similar to the input energy. Such a condition may balance the flow of the input energy from the external power source to the vehicle and the flow of the output energy from the vehicle back to the external power source (e.g., cause the vector sum of energy to and from the vehicle to be generally equal to zero).

Figure 1:
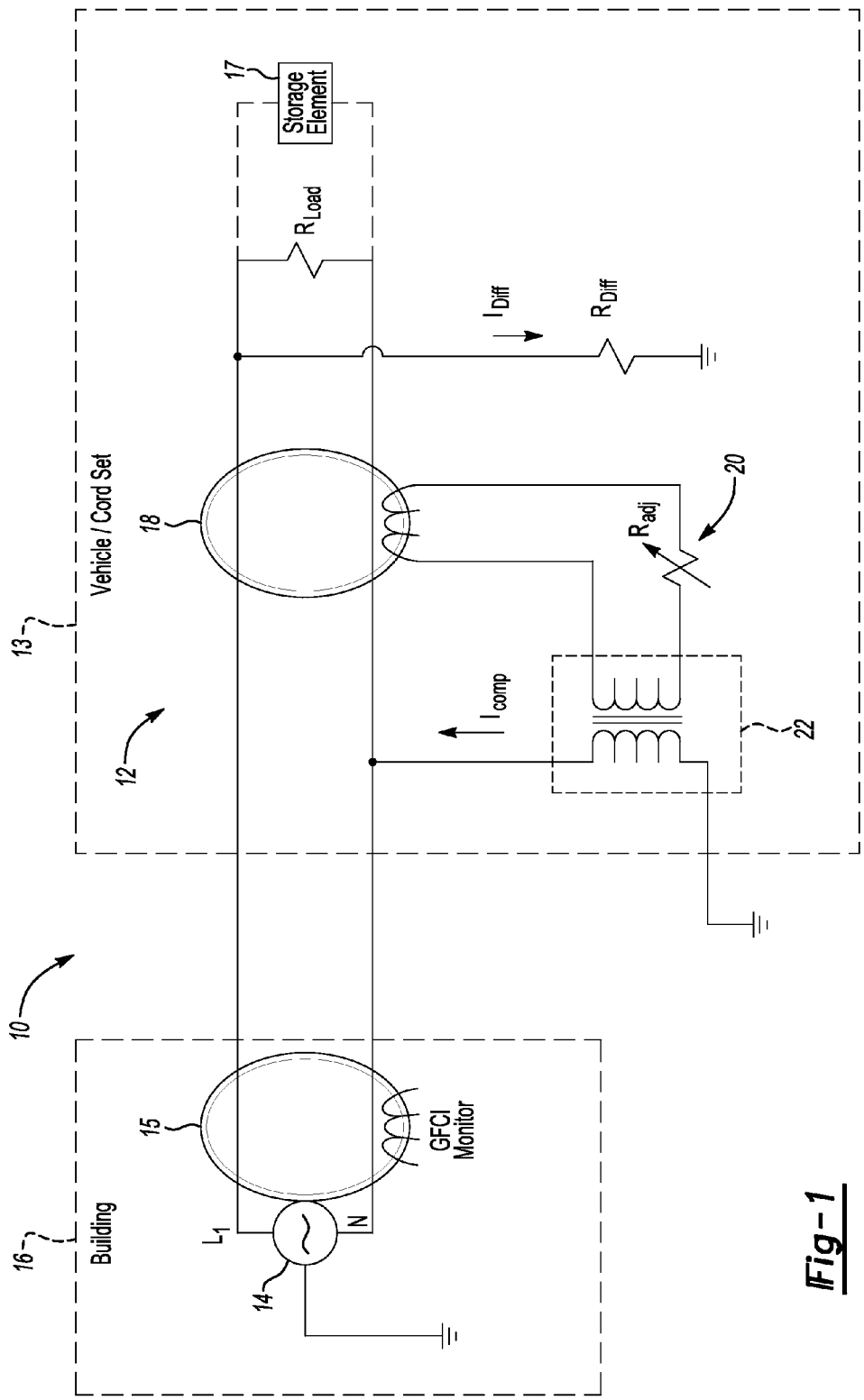
FIG. 1 depicts a circuit for balancing the transfer of electrical energy to a vehicle in accordance to one embodiment of the present invention.

Referring now to FIG. 1, a balance system 10 in accordance to one embodiment is shown. The balance system 10 comprises a balance circuit 12 that is positioned within a module of a vehicle 13. In one example, the module may be a cord set that is used to enable at least one vehicle storage element 17 to be charged. The storage element 17 may be a battery, a super capacitor, or a flywheel. The cord set may be a portable module that can be removed from the vehicle 13 while being operably coupled to the vehicle for transferring AC power from a power source 14 positioned about a building 16 (or charging station) to the element 17. It is recognized that the power source 14 may be positioned about any abode, dwelling or other suitable location that is positioned external to the vehicle 13. It is generally contemplated that the balance circuit 12 may also be positioned within any non-portable module or controller in the vehicle 13 for the purpose of transferring AC power from the building 16 to the vehicle 13. The particular placement of the balance circuit 12 may vary based on the desired criteria of a given implementation.

The balance circuit 12 is generally configured to transfer the AC power to a device (e.g., a battery charger) for converting the AC power into DC power charge such that the at least one element 17 in the vehicle 13 can be charged therefrom.

Loads (e.g., $R_{load}$) may be operably coupled to the power source 14 for receiving AC power. In one example, such loads may be associated with the battery charger. When the vehicle is coupled to the power source 14, a line L1 and a Neutral (N) connection is established therebetween. L1 is an active connection for transferring the AC electrical energy to the vehicle 13. Neutral is a return connection for transferring the electrical energy back to the building 16. Ideally, the amount of energy on L1 and N should be similar to one another (e.g., the vector sum of current at the building 16 should be generally similar to zero).

A ground fault circuit interrupt (GFCI) 15 is positioned about the residence 16 for interrupting (or breaking) the circuit between the power source 14 and the loads in the event a differential current (e.g., $I_{diff}$) between line L1 and Neutral N exceeds a predetermined current value. In one example, the predetermined current value may be 5 ma. The predetermined current value may vary based on the desired criteria of a particular implementation.

A resistor (e.g., $R_{diff}$) may represent a differential resistance that is present or formed within the vehicle 13. $R_{diff}$ causes a differential current between L1 and N (e.g., $I_{diff}$) within the circuit 12. Examples of items in the vehicle 13 that may cause $I_{diff}$ (or leakage current) include, but not limited to, conductive coupling (e.g., a ground that is coupled to a chassis system of the vehicle 13) or electromagnetic compatibility (EMC) protection measures within the system 10 (or elsewhere in the vehicle). Such EMC protection measures may generate up to 10 ma of leakage current. It is recognized that $I_{diff}$ may be greater than 5 ma during various normal vehicle operating modes. Such a condition may create an unbalanced power supply 14 and cause the GFCI 15 to break the circuit in moments in which the vehicle 13 may still be operating at a normal mode. To remove such a condition (e.g., prevent the GFCI 15 from breaking unnecessarily to ensure proper energy transfer to the element 17 under normal operating modes), the balance circuit 12 is configured to ensure that the sum of currents (i.e., current flowing to and from the residence 16 on L1 and N) are substantially similar to zero.

The balance circuit 12 provides additional current (e.g., $I_{comp}$) so that the sum of currents flowing to and from the residence 16 on N and L1, respectively, is generally similar to or equal to zero. In general, the amount of current (e.g., $I_{comp}$) produced by the balance bias circuit 12 is substantially similar to $I_{diff}$.

The balance circuit 12 includes a differential current transformer 18, an adjustable compensation circuit 20 (e.g., $R_{adj}$) and a coupling transformer 22. In operation, the current transformer 18 measures the differential current ($I_{diff}$) (e.g., differential current between L1 and N) and outputs a current signal (or voltage signal) that is indicative of the measured differential current (or the measured voltage signal). The adjustable compensation circuit 20 receives the current signal from the current transformer 18 and drives the coupling transformer 22 with a modified current signal that is derived based on the value of the resistor $R_{adj}$ within the adjustable compensation circuit 20. A controller unit (not shown) may be operatively coupled to the adjustable compensation circuit 20 to adjust $R_{adj}$.

The coupling transformer 22 boosts the modified current signal to generate which is used to offset $I_{diff}$ so that the currents flowing to and from the building 16 on N and L1 are substantially equal to one another. In general, the amount of current (e.g., $I_{comp}$) produced by the balance bias circuit 12 is substantially similar to $I_{diff}$.

Figure 2:
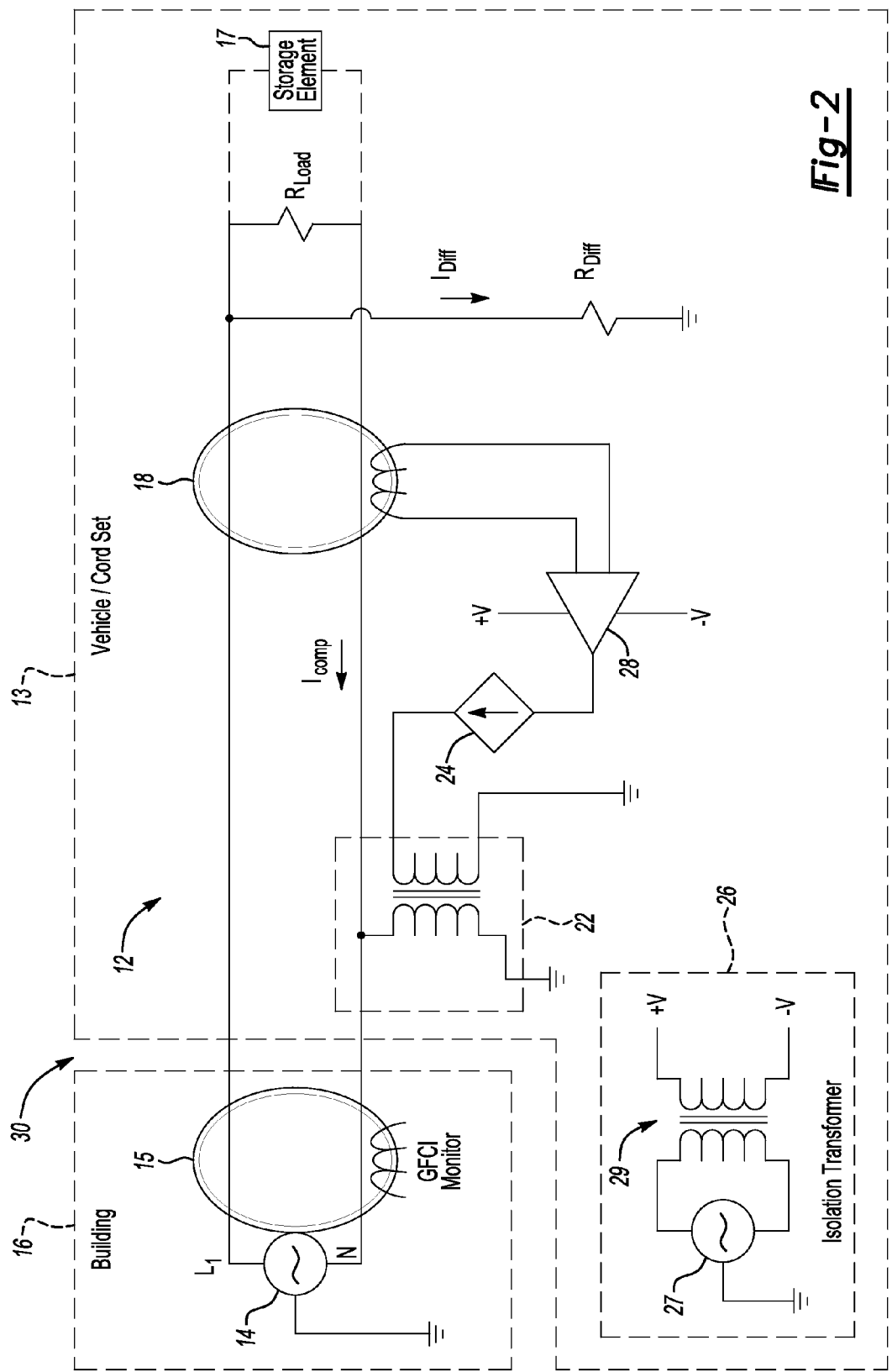
FIG. 2 depicts a circuit for balancing the transfer of electrical energy to a vehicle in accordance to another embodiment of the present invention.

Referring now to FIG. 2, a balance system 30 including the balance circuit 12 is shown in accordance to another embodiment of the present invention.

The balance circuit 12 includes the differential current transformer 18, the coupling transformer 22, a current source 24, an isolation transformer 26, and an amplifier 28. In one example, the amplifier 28 may be implemented as an error amplifier. In operation, the current transformer 18 measures the differential current ($I_{diff}$) (e.g., differential current between L1 and N) and outputs a current signal (or voltage signal) that is indicative of the measured differential current (or the measured differential voltage). The amplifier 28 receives the voltage signal from the current transformer 18 and compares the voltage signal to a reference voltage (e.g., +V and −V).

The amplifier 28 generates a modified voltage signal based on the comparison of the voltage signal received from the current transformer 18 to the reference voltage. The current source 24 generates a modified current signal in response to the modified voltage signal. The coupling transformer 22 boosts the modified current signal to generate $I_{comp}$ which is used to offset $I_{diff}$ so that the currents flowing to and from the building 16 on N and L1 are substantially equal to one another. In general, the amount of current (e.g., $I_{comp}$) produced by the balance bias circuit 12 is generally equal to $I_{diff}$. The isolation transformer 26 includes a power source 27 and a transformer 29 for generating the reference voltage. The isolation transformer 26 is generally configured to provide the reference voltage (e.g., +V and −V) for the amplifier 28.

Figure 3:
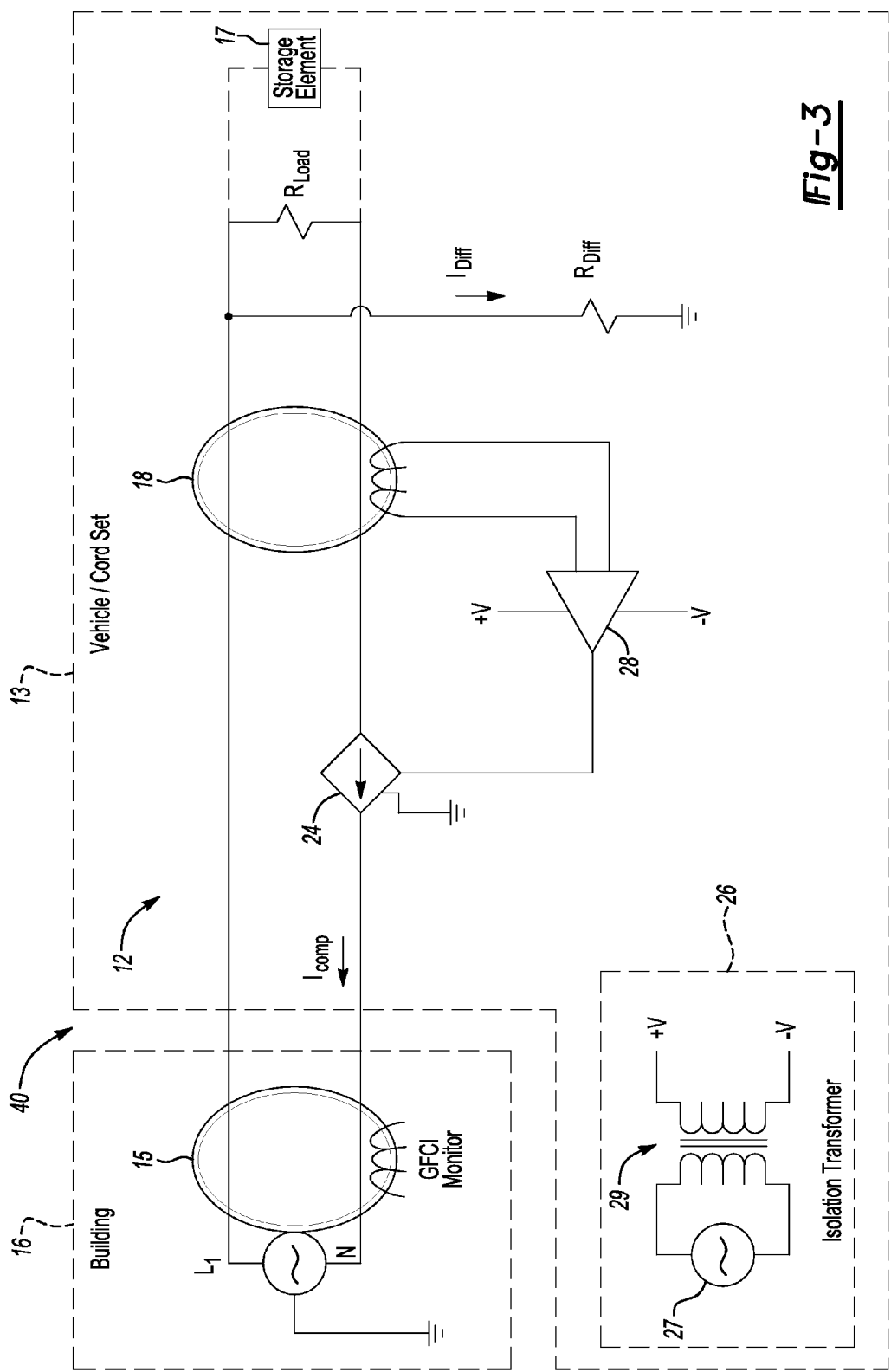
FIG. 3 depicts a circuit for balancing the transfer of electrical energy to the vehicle in accordance to another embodiment of the present invention.

Referring now to FIG. 3, a balance system 40 including the balance circuit 12 is shown in accordance to another embodiment of the present invention. The balance circuit 12 includes the differential current transformer 18, the current source 24, the isolation transformer 26, and the amplifier 28. In operation, the current transformer 18 measures the differential current (e.g., $I_{diff}$) (e.g., differential current between L1 and N) and outputs a current signal (or voltage signal) that is indicative of the measured differential current (or the measured differential voltage). The amplifier 28 receives the voltage signal from the current transformer 18 and compares the voltage signal to a reference voltage (e.g., +V and −V).

The amplifier 28 generates a modified voltage signal based on the comparison of the voltage signal received from the current transformer 18 to the reference voltage. The current source 24 is positioned in series with $R_{load}$. The current source 24 generates $I_{comp}$ which is used to offset $I_{diff}$ so that the currents flowing to and from the building 16 on N and L1 are substantially equal to one another. In general, the amount of current (e.g., $I_{comp}$) produced by the balance circuit 12 is generally equal to $I_{diff}$. The isolation transformer 26 is generally configured to provide the reference voltage (e.g., +V and −V) for the amplifier 28.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A device for balancing a flow of electrical energy from a vehicle to a power source that is positioned external to the vehicle, the vehicle being arranged to form a differential resistance, the device comprising:
   a balance circuit being configured to receive an input current signal from the power source and to transmit an output current signal to the power source for charging at least one storage element in the vehicle, wherein the differential resistance causes the input current signal and the output current signal to differ by a differential current amount, the balance circuit comprising:
      a current measuring device being configured to generate an output differential signal corresponding to the differential current amount; and
      a current generating device being configured to:
         generate a compensated current signal that is generally similar to the differential current amount in response to the output differential signal; and
         adjust the output current signal with the compensated current signal such that the output current signal is generally similar to the input current signal.

2. The device of claim 1 wherein the current generating device includes an amplifier being configured to generate an output modified signal corresponding to the differential current amount in response to the output differential signal.

3. The device of claim 2 wherein the current generating device further includes a current source being configured to generate the compensated current signal in response to the output modified signal.

4. The device of claim 3 wherein the current source configured to be placed in series with at least one vehicle load.

5. The device of claim 2 wherein the current generating device further includes a current source being configured to generate a modified current signal in response to the output modified signal.

6. The device of claim 5 wherein the current generating device further includes a coupling transformer being configured to boost the modified current signal for generating the compensated current signal.

7. The device of claim 2 wherein the current generating device further includes an adjustable compensation circuit being configured to generate a modified current signal in response to the output modified signal.

8. The device of claim 7 wherein the current generating device further includes a coupling transformer being configured to boost the modified current signal for generating the compensated current signal.

9. The device of claim 1 wherein the balance circuit is further configured to:
   receive the input current signal on a Line connection (L1) from the power supply; and
   transmit the output current on a neutral connection to the power supply.

10. The device of claim 1 wherein the vehicle is an electric vehicle and wherein the at least one storage element includes one of a battery, a supercapacitor, and a flywheel.

11. A device for balancing a flow of electrical energy from a vehicle to an external power source, the vehicle being arranged to form a differential resistance, the device comprising:
   a balance circuit being configured to receive an input current signal from the power source and to transmit an output current signal to the external power source for charging at least one storage element in a vehicle, wherein the differential resistance causes the input current signal and the output current signal to be different from one another, the balance circuit comprising:
      a current measuring device being configured to generate an output differential signal indicating a difference between the input current signal and the output current signal; and
      a current generating device being configured to:
         generate a compensated current signal in response to the output differential signal; and
         adjust the output current signal with the compensated current signal such that the output current signal is generally similar to the input current signal.

12. The device of claim 11 wherein the current generating device includes an amplifier being configured to generate an output modified signal corresponding to the difference in response the output differential signal.

13. The device of claim 12 wherein the current generating device further includes a current source being configured to generate the compensated current signal in response to the output modified signal.

14. The device of claim 13 wherein the current source is configured to be placed in series with at least one vehicle load.

15. The device of claim 12 wherein the current generating device further includes a current source being configured to generate a modified current signal in response to the output modified signal.

16. The device of claim 15 wherein the current generating device further includes a coupling transformer being configured to boost the modified current signal for generating the compensated current signal.

17. The device of claim 12 wherein the current generating device further includes an adjustable compensation circuit being configured to generate a modified current signal in response to the output modified signal.

18. The device of claim 17 wherein the current generating device further includes a coupling transformer being configured to boost the modified current signal for generating the compensated current signal.

19. The device of claim 11 wherein the balance circuit is further configured to receive the input current signal on a Line connection (L1) from the power supply and to transmit the output current on a neutral connection to the power supply.

20. A method for balancing a flow of electrical energy from a vehicle to an external power source, the vehicle being arranged to form a differential resistance, the method comprising:

receiving an input signal from the external power source to charge at least one vehicle storage element;

transmitting an output signal to the external power source, wherein the differential resistance causes the input signal and the output signal to be different from one another;

measuring a difference between the input signal and the output signal;

generating a compensated signal based on the difference; and adjusting the output signal with the compensated signal such that the output signal is generally similar to the input signal.

* * * * *

UNITED STATES PATENT AND TRADEMARK OFFICE
CERTIFICATE OF CORRECTION

PATENT NO. : 8,278,874 B2
APPLICATION NO. : 12/775124
DATED : October 2, 2012
INVENTOR(S) : Mark Anthony Mueller et al.

Page 1 of 1

It is certified that error appears in the above-identified patent and that said Letters Patent is hereby corrected as shown below:

Column 6, Line 44, Claim 12:

between "response" and "the", --to-- has been inserted.

Signed and Sealed this
Twenty-sixth Day of February, 2013

Teresa Stanek Rea
*Acting Director of the United States Patent and Trademark Office*